United States Patent Office 3,101,428
Patented Aug. 20, 1963

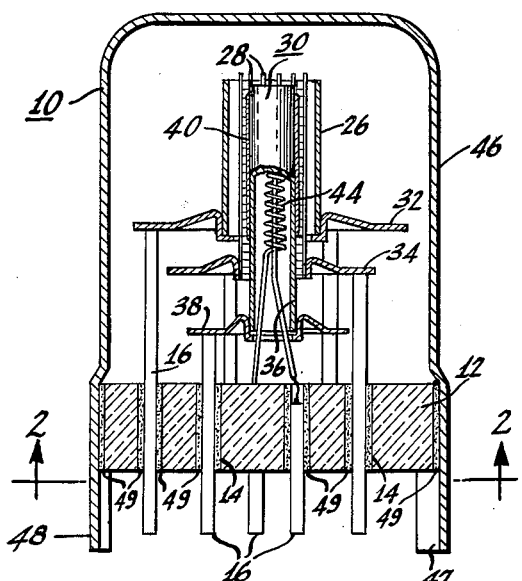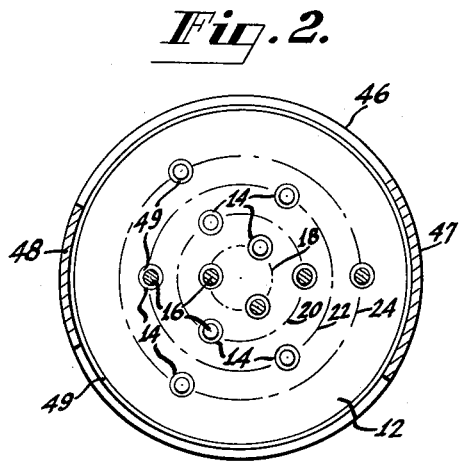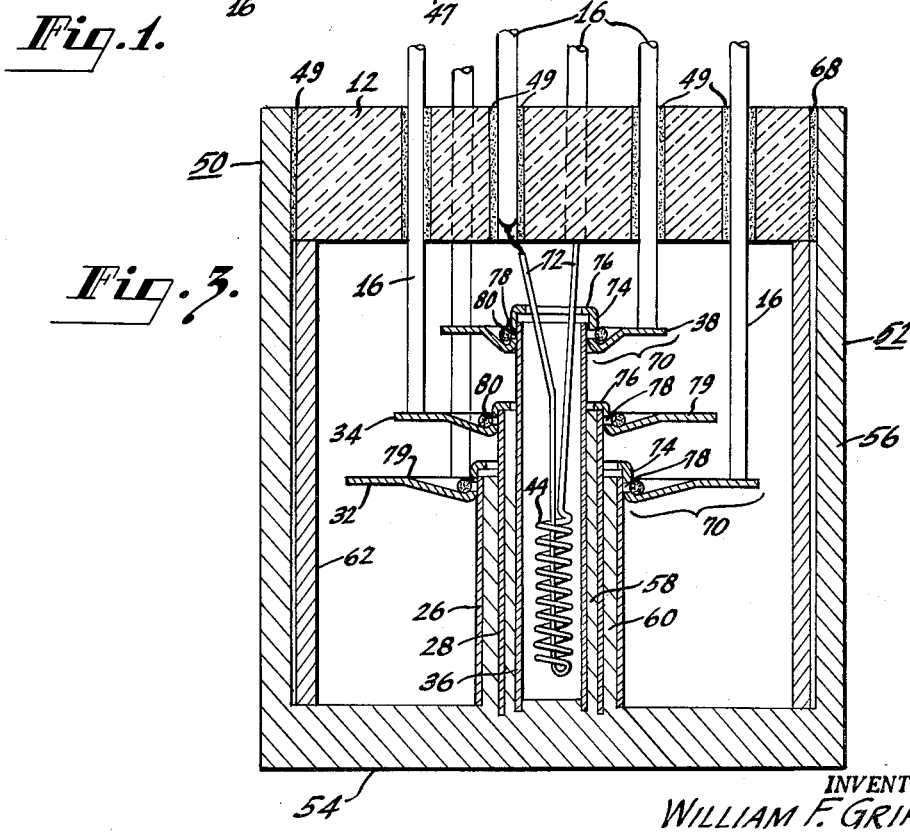

3,101,428
ELECTRON DISCHARGE TUBE AND ITS METHOD OF FABRICATION
William F. Griffin, Summit, N.J., assignor to Radio Corporation of America, a corporation of Delaware
Filed July 1, 1960, Ser. No. 40,264
13 Claims. (Cl. 313—252)

This invention relates to electron discharge tubes and to the electrode assemblies of such tubes, and more particularly, to a structure for and a method of brazing the tube electrodes to the electrode supports.

In the fabrication of one type of electron discharge tube, hereinafter described, it is the practice to braze the tube electrodes to electrode support elements supported in turn from the tube envelope. The tube electrodes may comprise a plurality of telescoped tubular elements, each having affixed to one end thereof an electrode support flange. Each flange is formed with a central tubular portion preferably having an inwardly directed lip or stop. The tubular portion is adapted to receive an end portion of an electrode to be supported thereby. The flanges are plated with a suitable brazing material for brazing the electrodes to the flanges.

The method of assembling such an electron tube involves the use of a jig adapted to receive and support individual tube parts in strain-free relation. The jig has means for receiving successively, in vertical position, the tubular electrodes in suitably spaced relation. Thereafter the flanges are loaded to engage and rest on the upper ends of the electrodes with the ends of the electrodes received within the tubular portions.

Subsequently, the jig with the parts loaded thereon is placed in an oven having a sufficiently high temperature for melting the brazing material on the flanges and for brazing the flanges to the electrodes.

In order to produce strain-free brazing of the flanges to the electrodes, the parts of the tube are assembled in the jig in loose relationship, with the flanges balanced and resting on the end portion of the respective electrodes. However, to avoid tilting of the flanges with respect to the electrodes, it is desirable that the fit between the electrode end portion and the tubular portion of the flange be relatively snug.

While it is possible to obtain the snug fit between the tubular portion of the flange and the end of the electrode received within the tubular portion while the jig and the parts therein are at room temperature, such a snug fit is not maintained at the elevated temperatures required for brazing because the flange is normally of one material and its associated electrode of a different material, the flange material having the larger coefficient of thermal expansion. Thus, at brazing temperatures, the flange tubular portion of the flange expands to a larger extent than the electrode therein, and a relatively large space is formed between the electrode and the wall of the flange tubular portion. Furthermore, when the brazing material plated onto the flange melts and flows, the space between the electrode and the walls will be further increased.

The effect of this increased spacing is that the brazing material available within the tubular portion and that which flows thereto from other portions of the plated flange is often insufficient to completely fill the space and to adequately and uniformly braze the entire periphery of the electrode to the tubular portion of the flange. Furthermore, increasing the thickness of the plating to provide more brazing material only aggravates the problem. The thicker plating simply provides greater space when the plating melts and flows.

Such incomplete brazing of the electrodes makes the tube more susceptible to microphonic noise output. That is, if the electrode, for example, were a grid having a plurality of side rods which fit into the tubular portion, only a portion of the side rods might be brazed solidly to the support flange while the remaining side rods would be relatively free to move therein. As is well known, such poor fixing of grid electrodes affects the resonant frequency of the grids and increases the microphonic noise produced therefrom.

A further disadvantage to incomplete peripheral brazing of the electrodes is that the spaces between the electrodes and the flange tubular portion walls which are not filled with brazing material present a large thermal resistance to heat flow. Such thermal resistances prevent efficient conduction of heat from the electrodes through the support flanges to the tube envelope, and cause the electrodes to operate at destructively high temperatures.

Also, incomplete or non-uniform peripheral brazing of the electrodes to their flanges results in non-symmetrical stresses about the contours of the electrodes. Such stresses, in turn, may result in the tilting of the electrodes with respect to their flanges and to each other when the brazed tube is removed from the jig. Any tilting of the electrodes changes the spacing therebetween and hence alters the tube electrical performance.

An object of this invention is to provide an improved mechanical and electrical engagement between a tube electrode and its support and a method of obtaining such engagement.

Another object of this invention is to provide an improved method and structure for obtaining a complete braze between the ends of tube electrodes and their support elements.

More particularly, it is an object of this invention to provide means for supplying sufficient brazing material to the parts being brazed to completely fill the space between the parts.

A further object of this invention is to provide means in a tube of the type described for increasing the snugness of fit between the ends of tube electrodes and their support elements at elevated temperatures to provide more uniform brazing of the electrodes to the support elements and to prevent tilt of the electrodes with respect to the support elements.

Another object of this invention is to provide in a tube of the type described low thermal resistance paths between the tube electrodes and the electrode supports and thereby reduce the operating temperatures of the electrodes.

A still further object of this invention is to provide in a tube of the type described a positive and rugged support of the electrodes and thereby reduce microphonic tube noise.

This invention employs electrodes and flanges of the general shape described above, except that preferably no brazing material is applied to the flange and the tubular member is of smaller diameter making a tighter fit with the electrode received therein. In a preferred embodiment of the invention, I provide a plurality of holes in the wall of the tubular portion of the flange. Adjacent the tubular portion and on the side opposite from the tube electrode therein, I provide an abundant supply of brazing material in any convenient form. Upon heating of the jig containing the above-mentioned parts, the brazing material on the outside of the tubular portion melts and flows through the holes to provide sufficient brazing material to completely braze the electrode therein to the tubular portion walls. The inside of the tubular portion may be plated with brazing material, although in the preferred embodiment, the flange including the tubular portion is unplated, all the brazing material coming from outside the tubular portion. The advantage of this construction is that the spacing between the electrode and the wall of the tubular portion, upon heating, is that due only to the difference of expansion between the parts. The additional spacing resulting from the melting of the plating as in the prior art devices is thus avoided. The smaller spacing also requires less brazing material while permitting more uniform brazing. Sufficient brazing material is provided to furnish material for the brazed joints between the periphery of the flanges and the conductors brazed thereto.

Further features and objects of this invention will become apparent as the description continues with reference to the drawing, wherein:

FIG. 1 is a vertical section of an electron tube of the type in which my invention has utility;

FIG. 2 is a bottom plan view taken along line 2—2 of FIG. 1; and

FIG. 3 is a longitudinal section of a brazing jig in which certain parts of the electron tube of FIG. 1 are shown mounted ready for the brazing operation.

In FIGS. 1 and 2, an electron tube of a type wherein my invention has utility is shown. The tube 10 includes a ceramic disk header or wafer 12 having a plurality of bores 14 therethrough. A plurality of electrode support and lead-in conductors 16 are sealed in vacuum-tight relation in the bores 14.

As shown in FIG. 2, the bores 14 are arrayed in four concentric circles 18, 20, 22 and 24 shown in dotted line. Three bores 14 are disposed in 120°, equidistant, relation on each of the circles. The bores in adjacent circles are angularly displaced 60° to provide maximum spacing therebetween.

The electron tube 10 comprises coaxial cylindrical anode, grid, and cathode electrodes 26, 28 and 30, respectively. The anode 26 is mounted on a radially extending flange 32, which is in turn mounted on three conductors 16 which extend into bores 14 on the outer circle 24. The grid electrode 28 is similarly mounted on a radially extending flange 34 which is in turn mounted on three of the conductors 16 which extend into bores 14 on the circle 22. The cathode 30 comprises a cathode support sleeve 36 mounted on a radially extending flange 38, which is supported on three of the conductors 16 extending into the three bores on the circle 20.

As shown in FIG. 3, the flanges 32, 34 and 38 have centrally disposed tubular or cup-like portions 74 having inwardly turned stops 76 for receiving end portions of the electrodes referred to and radially extending portions 70 engaged with the conductors 16. Furthermore, the tubular portions have a plurality of small holes 78 therein for allowing communication between the inside of the tubular portions and the upper surface 79 of the radially extending portions 70.

The cathode 30 also includes an emissive sleeve 40 (FIG. 1) which is disposed over the support sleeve 36, and which is coated with a suitable electron emissive material. The inner surface of sleeve 40 and the outer surface of sleeve 36 are sufficiently rough that they may be joined together by sintering. A coiled heater 44 is disposed in the cathode support sleeve 36 and connects to a pair of the conductors 16 which are sealed through two bores 14 on the inner circle 18. A vacuum-tight envelope is provided by a cup-shaped shell 46 which is sealed to the periphery of the ceramic disk header 12. The shell 46 includes a pair of extending arcuate tongues 47 and 48 which serve to protect the externally extending conductors 16 and facilitate socketing of the tube. Both of the conductors 16 connected to the heater 44 extend through the ceramic header 12 and form terminal prongs. Only one conductor 16 of each of the set of three conductors connected respectively to the anode, grid and cathode flanges extend through and beyond the ceramic header 12 to provide terminal prongs.

In one form of the tube 10, the conductors 16 and the side rods of the grid 28 are made of molybdenum; the cathode support sleeve 36 is principally Nichrome; the anode 26 is nickel; and the flanges 32, 34 and 38 are steel.

The selection of these materials is dependent upon many diverse factors. The grid side rods, for example, are made of molybdenum because of the strength of this material and because of its high thermal conductivity. The former property is important because of the inherently fragile nature of wound grids of the type shown, and the latter property is important because of the necessity of efficiently removing the heat radiated to the grid from the cathode. The flanges are made of steel because of the ease of forming this material, and because it is relatively inexpensive. Similar reasons exist for the choice of the other materials mentioned.

The significance of the above is that it is thus impractical to make the flanges and the electrodes supported thereby of the same materials. Hence, upon heating of the tube for brazing the parts, as mentioned, unequal expansion of the parts results.

In the fabrication of the electron tube 10, a metallic coating 49, such as molybdenum, is applied to the ceramic disk header 12 on its outer periphery and on the walls of the bores 14. Such a coating may be applied by any suitable known metallizing process. It has been found expedient to coat all surfaces of the ceramic disk header 12 with molybdenum and then grind the two planar surfaces thereof to remove the coating therefrom. Thus, only the outer periphery and the walls of the bores 14 are left with a metallized coating 49.

The conductors 16 are coated, such as by electroplating, with a brazing material, such as copper. Thus, when the conductors 16 are disposed through the metallized bores 14 and the assembly is heated to a sufficient temperature, vacuum-tight brazed seals are effected between the conductor 16 and the ceramic disk header 12. In similar manner, to be described, the flanges 32, 34 and 38 are brazed to their respective electrodes and conductors. The shell 46 is sealed to the periphery of the ceramic header 12 in a final hard soldering step. The details of the brazing process will be more fully described with reference to FIG. 3.

In FIG. 3 a two-piece brazing jig 50 is shown. The jig 50 comprises a cup-like housing 52 which includes a circular cup base 54 and a hollow circularly cylindrical cup wall 56. A plurality of hollow cylindrical jigging elements 58 and 60, coaxial with the cup wall 56, extend from the cup base 54 within the cup 52. The cup base 54, the cup wall 56, and the jigging elements 58 and 60 may or may not be provided as an integral structure.

The inner cylindrical jigging element 58 has a diameter such that it can receive in snug contacting relation therewithin the cathode support sleeve 36. The wall thickness of the inner jigging element 58 and the inside diameter of the outside jigging element 60 are such that the grid 28 of the electron tube 10 can be snugly received between these two elements. The wall thickness of the inner jigging element 58 is, moreover, such as to result in a desired ultimate spacing of the emissive sleeve 40 from the grid 28 when the emissive sleeve 40 is disposed over the cathode support sleeve 36. The size of the outer jigging element 60 is such that the element 60 snugly receives the anode 26 therearound.

The brazing jig 50 also includes a hollow cylindrical insert support 62 which is adapted to be received coaxially within the cup wall 56 in a loose fit therewith. The ceramic disk header 12 is axially supported upon the end of the insert 62, which in turn rests on the cup base 54. The insert 62 is of a length suitable to provide a selected spacing of the anode, grid, and cathode electrodes 26, 28 and 30, respectively, from the ceramic disk header 12.

In the assembly and fabrication of the electron tube 10, the jig 50 is oriented with the open end up. As shown in FIG. 3, an anode 26, a grid 28, and a cathode support sleeve 36 are loaded into contact with the inner and outer jigging elements 58 and 60. An anode flange 32, a grid flange 34, and a cathode flange 38 are deposited in the order named on their respective electrodes. Each of these electrodes have diameters for snug entrance into the tubular portions 74 of the flanges, and against the inwardly turned stops 76 thereof. Rings 80 of a suitable brazing material, such as copper, are dropped over the flange tubular portions 74, and because of the troughs formed between the junction of the radially extending portions 70 of the flanges and the tubular portions 74, as shown, are automatically positioned adjacent the openings 78. In this embodiment, the flanges are not coated with brazing material, and the rings 80 supply sufficient brazing material to braze both the electrodes within the tubular portions 74 and the conductors 16 to the periphery of the flanges.

The advantage of leaving the flanges uncoated has already been mentioned. That is, with brazing material coated on the inside of the tubular portion, the total spacing between the outer electrode surfaces and the wall of the tubular portion during the brazing operation is the sum of the spacings therebetween due to difference in thermal expansion of the parts, and the spacings created by the melting and flowing of the brazing material coating. Although, in accordance with my invention, sufficient brazing material from outside the tubular portions may be added to fill this space, it is nevertheless desirable to keep this spacing as small as possible to avoid any possible tilting of the parts during the brazing operation.

An alternate construction would be to coat only the top surfaces 79 of the flanges with a relatively heavy coating of brazing material. This would be equivalent to adding the ring 80 of brazing material to the flanges, as described, but this would involve the relatively expensive process of preferentially coating only one surface of the flanges.

The two legs 72 of a coil heater 44 are then attached to a pair of conductors 16 which are inserted in proper bores 14 in the ceramic disk header 12. The header 12 is then disposed in the jig cup 52 on top of the insert 62. The remaining nine conductors 16, three for each electrode flange, are loaded into their proper bores in the header 12. The conductors 16 are such that they fit snugly within the bores 14 but are nevertheless slidable therein so that they may drop downwardly and into contact with their respective electrode flanges. Prior to such assembly, the ceramic header 12 has been provided with metallic coatings 49 on the outer periphery 48 and the walls of the bores 14 as hereinbefore described. The conductors 16 have also been previously coated with a suitable brazing material (not shown).

The assembly of the jig 50 and the electron tube parts shown in FIG. 3 are then inserted in a furnace and heated in a reducing atmosphere to a temperature sufficient to melt the brazing material coated on the conductors 16 and the brazing material rings 80 on flanges 32, 34 and 38. The brazing material of the rings 80 flows through the openings 78 in each flange tubular portion and completely fills the space between the electrode therein and the tubular portion inner walls. Part of the brazing material runs up the radially extending flange portions 70 of the flanges due to the "wetting" action of molten copper on steel to the periphery of the flanges to add to the brazing material from the conductors 16 thereon. Upon cooling, the parts referred to are uniformly and completely brazed together to form a unitary mount structure.

Following this brazing operation, the cathode emissive sleeve 40 is placed over the cathode support sleeve 36 and the envelope shell 46 is fitted in contact with the ceramic header 12. A preformed ring of a hard solder is positioned in contact with the tube shell 46 and the ceramic header periphery 48. This assembly results in a complete tube assembly which is then subjected to a final furnace heating in vacuum. This final processing step serves to evacuate the tube, sinter the cathode emissive sleeve 40 to the cathode support sleeve 36, and solder the shell 46 to the periphery 48 of the header 12. The temperature employed in this final step is substantially below the previous brazing temperature. Accordingly, the previously made brazes are not affected.

From the preceding description of the means to braze the tube electrodes to their support electrodes, it will be appreciated that complete and uniform brazing may be achieved. By virtue of providing holes in the tubular portion of the flanges, sufficient brazing material may be supplied to fill the space created between the electrodes and the flange wall due to the unequal thermal expansion of the parts. Moreover, by supplying the brazing material entirely from outside the tubular portions, the space between the electrodes and the flanges is reduced during brazing, thus avoiding much of the deleterious effects of excess spacing.

What is claimed is:

1. An electron tube assembly comprising a tubular electrode and a support member fixed to an end of said electrode, said support member having a central opening, an inner surface, an outer surface, and at least one further opening through said support member providing communication between said surfaces, said electrode being in contact with the inner of said surfaces, and said outer surface having a supply of brazing material thereon, whereby said brazing material may flow through said further opening for brazing said electrode to said support member when heated to brazing temperature.

2. An electron tube assembly comprising an electrode and a support member in contact with said electrode, said support member having an opening, an inner surface, an outer surface, and at least one further opening through said support member providing communication between said surfaces, said electrode being in contact with the inner of said surfaces, and said outer surface having a supply of brazing material thereon, whereby said brazing material will flow through said further opening for brazing said electrode to said support member when heated to brazing temperature.

3. An electron tube comprising an electrode and a support member fixed to said electrode, said support member having a central opening, an inner surface and an outer surface, said electrode being fixed to said inner surface, adjacent said central opening, brazing material between said electrode and said inner surface of said support and on the surface of said support member electrically and mechanically fixing said electrode and support together, and a further opening in said support member between said surfaces adjacent said central opening through which brazing material flowed during assembly of said tube.

4. An electron tube assembly comprising an elongated tubular electrode and a support member coated with brazing material, said support member including a radially extending portion and a centrally disposed portion of cup-like structure for receivng an end of said electrode, the wall of said cup-like structure having at least one opening therethrough whereby brazing material from said radially extending portion will flow through said opening to the inside of said cup-like structure for brazing said electrode to said support member.

5. An electron tube assembly comprising an elongated tubular electrode and a support member, said support member comprising a radially extending portion and a tubular portion, and said support member having brazing material thereon, said electrode having an end portion engaged within said tubular portion, and said tubular portion having at least one opening through the wall thereof for communication between the inside of said tubular portion and said radially extending portion for brazing said electrode to said tubular portion.

6. An electron tube assembly comprising an elongated tubular electrode and a support member, said support member comprising a radially extending portion and a tubular portion coaxial with said radial portion, said radial portion being adapted to receive a ring of brazing material, said electrode having an end portion engaged within said tubular portion, and said tubular portion having at least one opening through the wall thereof for commuciation between the inside of said tubular portion and said radial portion, whereby said brazing material may flow from said radial portion through said opening for brazing said electrode to said tubular portion.

7. An electron tube assembly comprising an elongated tubular electrode and a support member, said support member comprising a radially extending portion and a tubular portion coaxial with said radial portion, the juncture between said radial portion and said tubular portion forming a recess adapted to receive a ring of brazing material, said electrode having an end portion engaged within said tubular portion, and said tubular portion having at least one opening through the wall thereof for communication between the inside of said tubular portion and said recess, whereby said brazing material may flow from said recess through said opening for brazing said electrode to said tubular portion.

8. An electron tube comprising an elongated tubular electrode and a support member, said support member comprising a radially extending portion and a tubular portion coaxial with said flange, said electrode having an end portion within said tubular portion and being fixed to said tubular portion, brazing material between said tubular portion and the end portion of said electrode and on the surface of said radial portion and an opening through the wall of said tubular member through which brazing material extends between the brazing material within said tubular portion and the brazing material on said radial portion.

9. An electron tube assembly comprising an elongated tubular electrode and a support, said support comprising a radially extending portion and a tubular portion coaxial with said radial portion, said radial portion having a brazing material thereon externally of said tubular portion, said tubular portion extending in one direction from said radial portion, said electrode having an end portion engaged within said tubular portion and extending from said radial portion in a direction opposite to said one direction, and said tubular portion having at least one opening through the wall thereof for communication between the inside of said tubular portion and said radial portion, whereby brazing material may flow from said radial portion through said opening to the inside of said tubular portion during brazing of said electrode to said support.

10. An electron tube assembly comprising an insulating wafer and an electrode support member supported therefrom, said support member comprising a radially extending portion and a centrally disposed tubular portion, said tubular portion extending in one direction from the outer surface of said radial portion, and said tubular portion having at least one opening through the wall thereof for allowing communication from the inside of said tubular portion to the outside surface of said radial portion, and a tubular electrode having an end portion engaged within said tubular portion and extending in a direction opposite to said one direction, said insulating wafer having a plurality of openings therethrough, a plurality of wires extending into said openings and afixed to the walls thereof, said wires having ends fixed to peripheral portions of the outer surface of said radial portion, and a source of brazing material on the outer surface of said radial portion, whereby, upon heating, said brazing material may flow through said opening to the inside of said tubular portion and along said radial portion to said peripheral portions for brazing said electrode and said wires to said support member.

11. An electron tube assembly comprising an electrode and an annular support member having a centrally disposed opening defined by a portion of said support member, an end of said electrode being engaged with said portion, and an aperture through said annulus allowing flow of brazing material from one surface of said annulus through said aperture and into contact with said electrode.

12. An electron tube assembly comprising an elongated tubular electrode and an annular support member having a centrally disposed opening defined by a portion of said support member, an end of said electrode being snugly engaged with said portion of said annulus, and an aperture smaller than said opening through said annulus and adjacent said opening allowing flow of brazing material from one surface of said annulus through said aperture and into contact with said electrode.

13. An electron tube comprising an electrode and an annular support member fixed to said electrode, said support member having a centrally disposed opening defined by a portion of said support member, said electrode being received within said opening, brazing material between said electrode and said portion electrically and mechanically fixing said electrode and support together, and an aperture through said support member and adjacent said opening through which brazing material flowed during assembly of said tube.

References Cited in the file of this patent
UNITED STATES PATENTS 2,880,349    Polese  ---------------- Mar. 31, 1959
2,962,619    Rose  ------------------ Nov. 29, 1960